US008885190B2

(12) United States Patent
Ray et al.

(10) Patent No.: US 8,885,190 B2
(45) Date of Patent: Nov. 11, 2014

(54) SYSTEM, METHOD AND COMPUTER PROGRAM PRODUCT FOR IMPLEMENTING A PRINT SERVICES NETWORK

(75) Inventors: Elton T. Ray, Livonia, NY (US); James C. Howell, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 967 days.

(21) Appl. No.: 12/765,025

(22) Filed: Apr. 22, 2010

(65) Prior Publication Data
US 2011/0261390 A1  Oct. 27, 2011

(51) Int. Cl.
*G06F 3/12* (2006.01)

(52) U.S. Cl.
CPC .............. *G06F 3/126* (2013.01); *G06F 3/1288* (2013.01); *G06F 3/1217* (2013.01); *G06F 2206/1508* (2013.01)
USPC .......................... 358/1.15; 358/1.13; 358/1.16

(58) Field of Classification Search
USPC ......................................................... 358/1.15
See application file for complete search history.

(56) References Cited

U.S. PATENT DOCUMENTS

| | | | |
|---|---|---|---|
| 5,826,270 A | | 10/1998 | Rutkowski et al. |
| 5,978,560 A * | | 11/1999 | Tan et al. ...................... 358/1.15 |
| 6,032,004 A | | 2/2000 | Mirabella, Jr. et al. |
| 6,078,906 A | | 6/2000 | Huberman |
| 7,042,585 B1 | | 5/2006 | Whitmarsh et al. |
| 7,210,407 B2 | | 5/2007 | Silverbroo |
| 7,216,347 B1 * | | 5/2007 | Harrison et al. ............... 718/103 |
| 7,242,490 B1 | | 7/2007 | Palmer et al. |
| 2003/0128384 A1 | | 7/2003 | Nelson et al. |
| 2003/0182137 A1 | | 9/2003 | Whitmarsh et al. |
| 2004/0008371 A1 * | | 1/2004 | Keane et al. .................. 358/1.15 |
| 2004/0136028 A1 | | 7/2004 | Rabb |
| 2005/0068562 A1 * | | 3/2005 | Ferlitsch ....................... 358/1.14 |
| 2005/0141023 A1 * | | 6/2005 | Yagita et al. .................. 358/1.15 |
| 2006/0050294 A1 | | 3/2006 | Smith et al. |
| 2007/0019228 A1 * | | 1/2007 | Rai et al. ....................... 358/1.15 |
| 2009/0021773 A1 * | | 1/2009 | Rai ............................... 358/1.15 |

* cited by examiner

*Primary Examiner* — Marivelisse Santiago Cordero
*Assistant Examiner* — Aaron R Gerger
(74) *Attorney, Agent, or Firm* — Gibb & Riley, LLC

(57) ABSTRACT

Disclosed are embodiments of a system, method and computer program product for implementing a federated print services network. The embodiments provide a central server that receives external print job requests from customers and, optionally, any backlog of internal print job requests from a participating print shop or any internal print job requests that are outside a participating print shop's current printing capabilities or that exceed the participating print shop's supply inventory. The server can selectively distribute those requests amongst the participating print shops in the network for fulfillment. Distribution is based on printing equipment utilization records in order to balance printing equipment utilization across the network and, if necessary, on printing capability records and/or supply inventory records. Thus, for participating print shops, the embodiments provide a means for increasing equipment utilization percentages during downtimes and, thereby a means to subsidize the cost of ownership. They also provide a means for abating any backlog of print job requests and fulfilling, as necessary, any internal print job requests.

18 Claims, 4 Drawing Sheets

SYSTEM, METHOD AND COMPUTER PROGRAM PRODUCT FOR IMPLEMENTING A PRINT SERVICES NETWORK

BACKGROUND

Embodiments disclosed herein generally relate to print services and, specifically, to a system, method and computer program product for implementing a print services network that provides for optimum print shop printing equipment utilization.

More particularly, print shops (i.e., document production environments), including independent print services enterprises (i.e., enterprises that offer and directly provide commercial print services to customers) and also printing departments within non-print services enterprises (i.e., printing departments within enterprises that do not offer and directly provide commercial print services to customers), are generally capable of fulfilling a wide variety of print job requests. Specifically, such print shops process print job requests using resources, including, but not limited to, printers, cutters, collators and other printing equipment, in order to generate a finished product (i.e., printed material). However, it is often difficult for such print shops to operate at capacity. Typically, at any given time, these print shops will operate either below capacity (i.e. at less than 100% printing equipment utilization) or above capacity (at 100% printing equipment utilization with a back log of print job requests). Thus, there is a need in the art for a system, method and computer program product for implementing a print services network that will provide for optimum printing equipment utilization.

SUMMARY

In view of the foregoing disclosed herein are embodiments of system, method and computer program product for implementing a print services network. The embodiments provide a central server that receives external print job requests from customers and, optionally, any backlog of internal print job requests from a participating print shop or any internal print job requests outside a participating print shop's current printing capabilities and/or inventory of printing supplies. The server selectively distributes those requests for fulfillment amongst the participating print shops. Distribution is based on printing equipment utilization records in order to achieve balanced equipment utilization across the network. For example, the server can distribute such print job requests to print shops with a relatively low percentage of equipment utilization before print shops with a relatively high percentage of equipment utilization. Once essentially balanced equipment utilization is achieved, the server can randomly distribute any subsequently received print job requests. If necessary, distribution can also be based on printing capability and/or inventory records. Thus, for participating print shops in the network, the embodiments provide a means for increasing equipment utilization percentages during downtimes and, thereby a means to subsidize the cost of ownership. The embodiments also provide a means for abating any backlog of internal print job requests and fulfilling any internal print job requests outside a particular print shop's printing capabilities or exceeding a particular print shop's inventory levels.

More particularly, disclosed herein are embodiments of a system for implementing a federated print services network. The system can comprise a data storage device, a server having access to the data storage device, and multiple print shop controllers, where each print shop controller is in communication with the server and is further associated with a particular print shop in a network of participating print shops.

The data storage device can store printing equipment utilization records for each of the multiple print shops. These equipment utilization records can be updated to ensure that the stored information is current.

The server can receive external print job requests (i.e., first print job requests) from customers and can distribute those external print job requests for fulfillment amongst the multiple participating print shops in the network based on the equipment utilization records. Specifically, the server can selectively distribute external print job requests amongst the multiple print shops in order to balance printing equipment utilization across the multiple print shops. For example, the server can distribute external print job requests to print shops with a relatively low percentage of equipment utilization before distributing them to print shops with a relatively high percentage of equipment utilization. Once balanced printing equipment utilization is achieved, the server can randomly distribute any additional external print job requests amongst the multiple print shops.

In the case where printing capabilities vary from print shop to print shop within the network, the data storage device can also store printing capability records for each of the print shops and the server can distribute the external print job requests amongst the multiple participating print shops based on both the printing capability records and the equipment utilization records. Similarly, supply inventory records for each of the print shops can also be stored and considered during distribution. As with the equipment utilization records, the printing capability records and supply inventory records can be updated to ensure that the stored information is current.

Each print shop controller for a particular print shop can receive any internal print job requests (i.e., second print job requests) submitted specifically to that particular print shop, can receive any external print job requests distributed to that particular print shop by the server, and can schedule fulfillment, by the particular print shop, of such internal and external print job requests. It should be noted that each print shop controller can schedule the print jobs according to defined priority rules. For example, any external print jobs can be scheduled according to a lower priority than the any internal print job requests.

Additionally, each print shop controller can determine the equipment utilization percentage and, optionally, the printing capabilities and/or the supply inventory of its corresponding print shop. As discussed above, this information can be used to update the records in the data storage device in order to receive external print job requests, when the operating capacity is low. However, it can also be used to determine if internal print job requests should be forwarded to the server. For example, if a print shop controller determines that a particular print shop is operating at maximum capacity with a backlog of print job requests, the print shop controller can forward the backlog of print job requests to the server. Furthermore, if a print shop controller determines that a particular internal print shop request is outside the printing capabilities of the particular print shop or exceeds the supply inventory of the particular print shop, the print shop controller can forward the internal print job request to the server. The server can, in turn, distribute such requests to any other print shop for fulfillment based on the equipment utilization records and, if necessary, on the printing capability records and/or the supply inventory records.

Also disclosed herein are embodiments of an associated method for implementing the federated print services network. The method embodiments can comprise receiving, by a server, of external print job requests (i.e., first print job requests) from customers. Next, the method embodiments can comprise accessing, by the server from a data storage device, equipment utilization records for multiple participating print shops in the network and, then, distributing those external print job requests for fulfillment amongst the multiple participating print shops. Distribution can be particularly based on the equipment utilization records stored in the data storage device. Specifically, the external print job requests can be selectively distributed, by the server, amongst the multiple participating print shops in the network order to balance printing equipment utilization across the network. For example, the external print job requests can be distributed to print shops with a relatively low percentage of equipment utilization before being distributed to print shops with a relatively high percentage of equipment utilization. Once balanced printing equipment utilization is achieved, any additional external print job requests can be randomly distribute amongst the multiple print shops.

In the case where printing capabilities vary from print shop to print shop within the network, the method embodiments can also comprise accessing, by the server from the data storage device, printing capability records for each of the print shops. Then, distribution of the external print job requests amongst the multiple participating print shops in the network can be based on both the printing capability records and the equipment utilization records. Similarly, supply inventory records for each of the print shops can also be accessed and considered during distribution.

The method embodiments can further comprise scheduling, by a print shop controller for a particular print shop, fulfillment of any internal print job requests (i.e., second print job requests) submitted specifically to the particular print shop and any external print job requests distributed to the particular print shop by the server. It should be noted that this scheduling process can be performed according to defined priority rules. For example, any external print jobs can be scheduled according to a lower priority than the any internal print job requests.

Additionally, the method embodiments can comprise determining, by each print shop controller, the equipment utilization percentage and, optionally, the printing capabilities and/or the supply inventory of its corresponding print shop. This information can be used to update the records in the data storage device in order to receive external print job requests, when the operating capacity is low. However, it can also be used to determine if internal print job requests should be forwarded to the server. For example, if a determination is made that a particular print shop is operating at maximum capacity with a backlog of print job requests, the backlog of print job requests can be forwarded to (i.e., received by) the server. Similarly, if a determination is made that a particular internal print job request is outside the printing capabilities of a particular print shop or exceeds the supply inventory of a particular shop, the particular print job request can be forwarded to (i.e., received by) the server. Then, such requests can be distributed, by the server, to any other print shop in the network for fulfillment based on the equipment utilization records and, if necessary, on the printing capability records and/or the supply inventory records.

Also, disclosed herein are embodiments of a computer program product for performing the above-described method. This computer program product can comprise a computer usable medium having computer useable program code, which is embodied therewith and which is configured to perform the method.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As discussed above, print shops (i.e., document production environments) are generally capable of fulfilling a wide variety of print job requests. However, it is often difficult for such print shops to operate at capacity. Typically, at any given time, these print shops will operate either below capacity (i.e. at less than 100% printing equipment utilization) or above capacity (at 100% printing equipment utilization with a back log of print job requests).

In view of the foregoing disclosed herein are embodiments of system, method and computer program product for implementing a print services network. The embodiments provide a central server that receives external print job requests from customers and, optionally, any backlog of internal print job requests from a participating print shop or any internal print job requests outside a participating print shop's current printing capabilities or exceeding a participating print shop's inventory of printing supplies. The server selectively distributes those requests for fulfillment amongst the participating print shops. Distribution is based on printing equipment utilization records in order to achieve balanced equipment utilization across the network. For example, the server can distribute such print job requests to print shops with a relatively low percentage of equipment utilization before print shops with a relatively high percentage of equipment utilization. Once essentially balanced equipment utilization is achieved, the server can randomly distribute any subsequently received print job requests. If necessary, distribution can also be based on printing capability records and/or supply inventory records. Thus, for participating print shops in the network, the embodiments provide a means for increasing equipment utilization percentages during downtimes and, thereby a means to subsidize the cost of ownership. The embodiments also provide a means for abating any backlog of internal print job requests and fulfilling any internal print job requests outside a particular print shop's printing capabilities.

Figure 1:
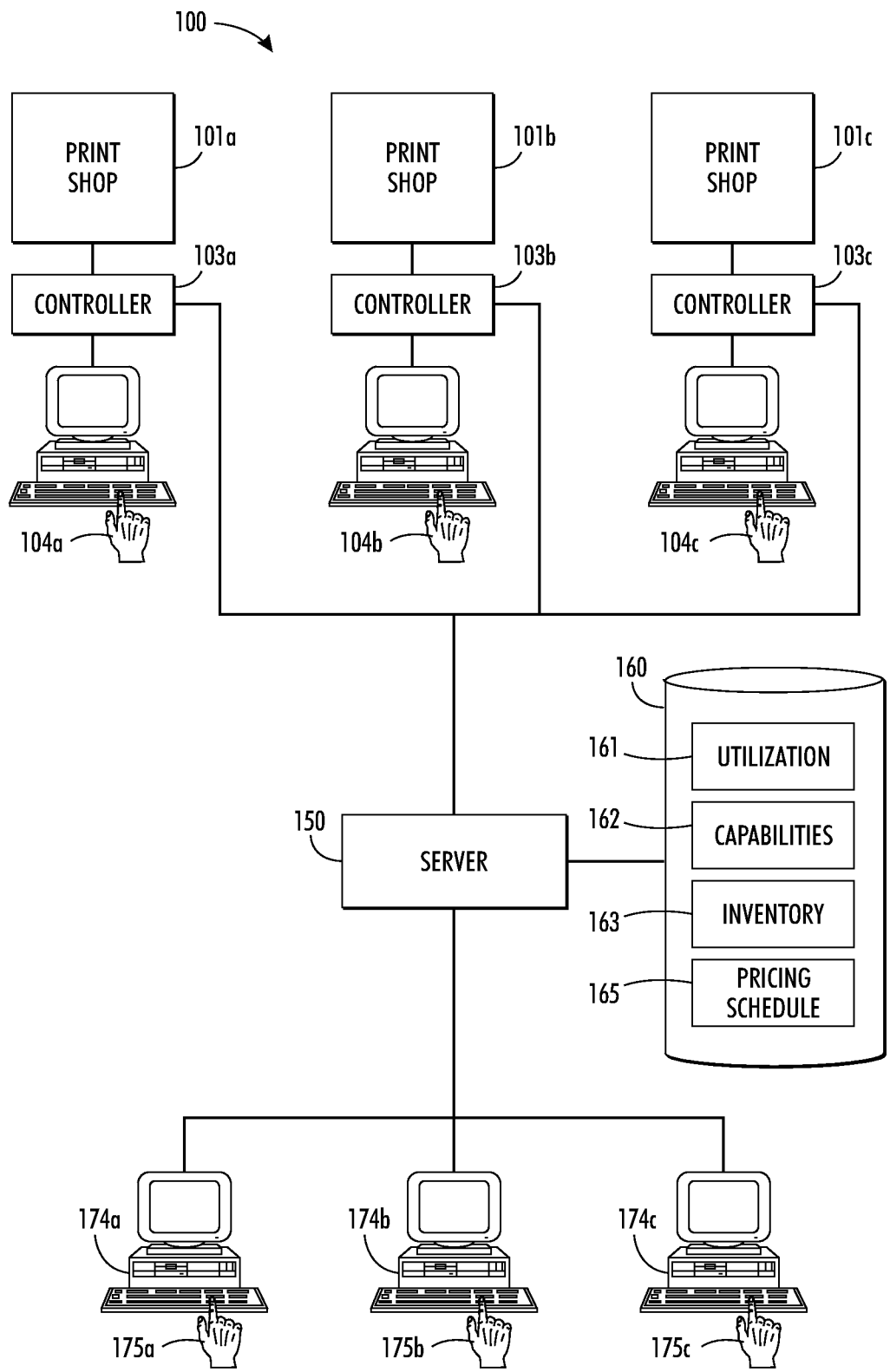
FIG. 1 is a schematic diagram illustrating an embodiment of a system for implementing a print services network.

More particularly, referring to FIG. 1, disclosed herein are embodiments of a system 100 for implementing a federated print services network. The system 100 can comprise a data storage device 160, a server 150 having access to the data storage device 160, and multiple print shop controllers 103*a-c*, where each print shop controller 103*a-c* is in communication with the server 150 and is further associated with (i.e., controls operation of) a particular remotely located print shop in a network of multiple, otherwise autonomous, participating print shops 101*a-c*.

It should be noted that for purposes of this application the term "print shops" refers to document production environments operated by independent print services enterprises (i.e., enterprises that offer and directly provide commercial print services to customers) and/or by printing departments within non-print services enterprises (i.e., in printing departments within enterprises that do not offer and directly provide commercial print services to customers). It should further be noted that the term "document production environment" refers to environments within which print job requests are processed using printing equipment, including, but not limited to, one or more printers, cutters, staplers, collators, binders, etc. in order to generate a finished product (i.e., printed material). It should be understood that the above-described printing equipment may be integrated into a single device or multiple devices. Finally, it should be noted that that term "enterprises" can refer to commercial and/or non-commercial enterprises including, but not limited to, companies, businesses, associations, organizations, corporations, establishments, outfits, partnerships and syndicates.

The data storage device 160 can store (i.e., can be adapted to store, configured to store, etc.) printing equipment utilization records 161 for each of the multiple print shops 101. That is, the data storage device 160 can maintain records 161 indicating the printing equipment utilization percentage for each print shop 101 (i.e., the capacity at which each print shop is operating). The data storage device 160 can store the equipment utilization records 161 in, for example, a database table, an Extensible Markup Language (XML) file, or other suitable data storage format. The equipment utilization records 161 can be updated (e.g., periodically, on-demand, etc.) to ensure that the stored information is current.

The server 150 can receive (i.e., can be adapted to receive, configured to receive, etc.) external print job requests (i.e., first print job requests) from customers 175a-c. It should be noted that, for purposes of this application, the term "external print job requests" refers to print job requests submitted to the server 150 by customers 175a-c. That is, the external print job requests are submitted to the server 150 rather than to a particular print shop. Additionally, it should be understood that the term "internal print job requests" refers to print job requests that are submitted to a particular print shop (e.g., print shop 101a, 101b, or 101c by user 104a-c, respectively (e.g., by an owner, employee, local customer, etc. of the enterprise operating that particular print shop 102) and not to the server 150.

Submission of external print job requests to the server 150 by customers 175a-c can, for example, be achieved through the use of an on-line print job request form. That is, customers 175a-c having internet accessible computer terminals 174a-c can open a website that is associated with the system 100. The website can be configured with a link to the on-line print job request form. This print job request form can be configured to allow customers to generate external print job requests. Such print job requests can include the document to be printed (e.g., as an attachment or as link) and can indicate, for example, the number of copies, paper size, paper weight, number of pages per sheet, single or double-sided, color, print quality, collating requirements, cutting requirements, stapling requirements, binding requirements, other finishing requirements, etc. The website can further be configured to allow customers to review completed on-line request forms prior to submission and to provide customers with pricing information (e.g., based on a pre-established pricing schedule 165 applicable across the network and also stored in the data storage device 160). Such a website can further be configured to allow customers 175 to submit the print job request forms (i.e., to upload the print job requests to the server 150). On-line forms are well-known in the art and, thus, the details are omitted from this specification in order to allow the reader to focus on the salient aspects of the invention. Additionally or alternatively, submission of external print job requests to the server 150 by customers 175a-c can be achieved through one or more other known means of communication (e.g., electronic mail, text messaging, voice messaging, via an agent, etc.).

The server 150 can further distribute (i.e., can be adapted to distribute, configured to distribute, etc.) the received external print job requests amongst the multiple participating print shops 101a-c in the network for fulfillment. Distribution can be particularly based on the equipment utilization records 161. Specifically, the server 150 can access that equipment utilization records 161 in the data storage device 160, compare the records 161 of the different shops 101a-c and can selectively distribute the external print job requests amongst the multiple print shops 101a-c in order to balance printing equipment utilization across the network. For example, the server 150 can distribute external print job requests to print shops 101a and 101b with a relatively low percentage of equipment utilization before distributing them to print shop 101c with a relatively high percentage of equipment utilization. Once balanced printing equipment utilization is achieved, the server 150 can randomly distribute any additional external print job requests amongst the multiple print shops 101a-c. It should be noted that prior to distribution the server 150 can convert (i.e., can be adapted to convert, configured to convert, etc.) each of the external print job requests into an appropriate format for processing by the controllers 103a-c. This format can be a uniform format readable by all controllers 103a-c or, if necessary, a controller-specific readable format.

In the case where printing capabilities vary from print shop to print shop within the network, the data storage device 160 can also store (i.e., can be adapted to store, configured to store, etc.) printing capability records 162 for each of the multiple print shops 101a-c. That is, the data storage device 160 can also maintain records 162 indicating the printing capabilities of each print shop 101a-c (e.g., paper options, color options, print quality options, page/sheet options, single or double-sided options, collating options, cutting options, stapling options, binding options, other finishing options, etc.). The data storage device 160 can store the printing capability records 162 in, for example, a database table, an Extensible Markup Language (XML) file, or other suitable data storage format. Then, prior to distribution of a particular external print job request to one of the print shops 101a-c, the server 150 can first access the capability records 162 and compare them to the particular external job request in order to limit the possible print shops to a sub-group of print shops having the required capabilities (e.g., to print shops 101a and 101b only). Then, the server 150 can selectively distribute the particular external print job request to one of the print shops within the sub-group based on the equipment utilization records 161. In other words, in the case where printing capabilities vary from print shop to print shop, the server 150 can distribute the external print job requests amongst the plurality of print shops 101a-b based on both printing capability records 162 and the equipment utilization records 161. Similarly, supply inventory records 163 for each of the print shops can also be stored in the data storage device 160 and distribution of the external print job requests, by the server 150, can be based on those records 163 also. That is, the data storage device 160 can also maintain records 163 indicating the inventory of consumable printing supplies for each print shop 101*a-c* (e.g., available amounts of paper of different sizes, weights, types, etc.; available amounts of marking material, such as toner or ink; etc.) and a particular print job request will be selectively distributed only amongst those print shops having sufficient printing supplies to fulfill the request.

Each print shop controller 103*a-c* for each particular print shop 101*a-c*, respectively, can receive (i.e., can be adapted to receive, configured to receive, etc.) any internal print job requests (i.e., a second print job requests) specifically submitted to that particular print shop, can receive any external print job requests distributed to the particular print shop by the server 150, and can schedule fulfillment, by the particular print shop, of such internal and external print job requests. It should be noted that each print shop controller 103*a-c* can schedule the print jobs according to defined priority rules. For example, any external print jobs can be scheduled according to a lower priority than the any internal print job requests. Theses defined priority rules can stored in the controllers 103*a-c*. Additionally, they can be the same for each print shop 101*a-c* or, alternatively, they can vary from print shop to print shop depending upon the business objectives of the enterprise operating the print shop.

Additionally, each print shop controller 103*a-c* can determine (i.e., can be adapted to determine, configured to determined, etc.) the equipment utilization percentage (i.e., the operating capacity) and, optionally, the printing capabilities and/or supply inventory of its corresponding print shop 101*a-c*, respectively. As discussed above, this information can be used to update the records in the data storage device 160 and, particularly, the equipment utilization records 161 and the printing capabilities records 162 in order to receive external print job requests, when the operating capacity is low. However, it can also be used to determine if internal print job requests should be forwarded to the server 150. For example, if a particular print shop controller (e.g., 103*b*) determines that its corresponding print shop 101*b* is operating at maximum capacity with a backlog of print job requests, the print shop controller 103*b* can forward the backlog of internal print job requests to the server 150. Similarly, if a particular print shop controller (e.g., 103*c*) determines that a particular internal print job request is outside the print capabilities of its print shop 101*c* or exceed the supply inventory levels of the print shop 101*c*, the print shop controller 103*c* can forward that internal print job request to the server 150. The server 150 can, in turn, receive and distribute such requests to any other print shop (e.g., 101*a*) in the network for fulfillment based on the equipment utilization records 161 and, if necessary, on the printing capability records 162 and/or the supply inventory records 163.

In addition to the features described above the server 150 can further perform intermediary functions such as billing operations, payment receipt operations, delivery and/or pickup notifications, etc. For example, a customer (e.g., 175*a*) can be provided with an option to pick-up a finished job at the print shop that fulfilled the job or, alternatively, to have the finished job delivered (e.g., by courier, package delivery service, U.S. Mail, etc.) to a specified location. Then, the server 150 can notify the customer 175*a* (e.g., by electronic mail, text message, automated voice message, or any other suitable communication means), when the finished job is ready for pick-up or has been shipped. This ensures that customers 175*a-c* submitting external print job requests to the server 150 via customer interfaces 174*a-c*, respectively, receive seamless and simplified access to the various print services offered through the network. It should be noted that billing and payment for fulfilling an external print job request can be set according to a pre-established pricing schedule 165 applicable across the network and stored in the data storage device 160. Optionally, the pre-established pricing schedule 165 can provide for preferred pricing for network participants (e.g. when any internal print job requests are forwarded to the server 150 by a print shop controller 103 for distribution to another print shop in the network).

Also disclosed herein are embodiments of a method of implementing a federated print services network.

Figure 2:
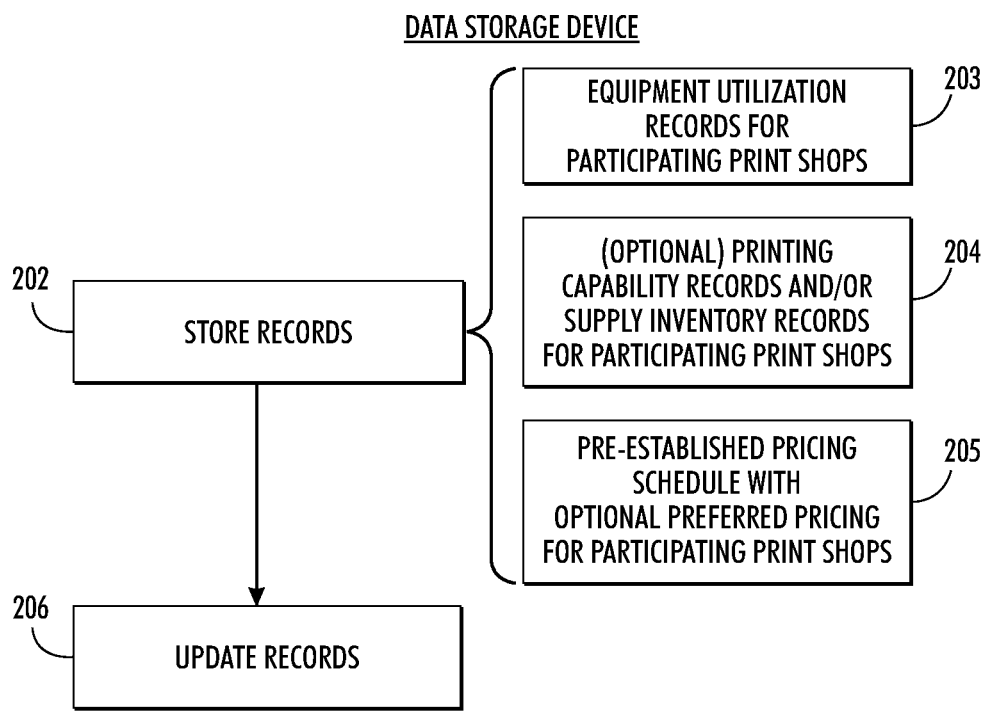
FIG. 2 is a flow diagram illustrating process steps of a method embodiment for implementing a print services network.

Referring to FIG. 2 in combination with FIG. 1, the method embodiments comprise storing, in a data storage device 160, one or more different records related to multiple, otherwise autonomous, print shops 101*a-c* participating in the network (202). Specifically, the method embodiments can comprise storing, in the data storage device 160, equipment utilization records 161 for multiple participating print shops 101*a-c* in a network (203). That is, records 161 indicating the printing equipment utilization percentage for each print shop (i.e., the capacity at which each print shop is operating) can be stored in the data storage device 160. Optionally, the method embodiments can also comprise storing, in the data storage device 160, printing capability records 162 and/or supply inventory records for the multiple print shops 101*a-c* in the network (204). That is, records indicating the printing capabilities of each print shop 101*a-c* (e.g., paper options, color options, print quality options, page/sheet options, single or double-sided options, collating options, cutting options, stapling options, binding options, other finishing options, etc.) can be stored in the data storage device. Similarly, records 163 indicating the inventory of consumable printing supplies for each print shop 101*a-c* (e.g., available amounts of paper of different sizes, weights, types, etc.; available amounts of marking material, such as toner or ink; etc.) can also be stored on the data storage device 160. These records 161, 162, 163 can also be updated (e.g., periodically, on-demand, conditionally, etc.) to ensure that the stored information is always relatively current.

Figure 3:
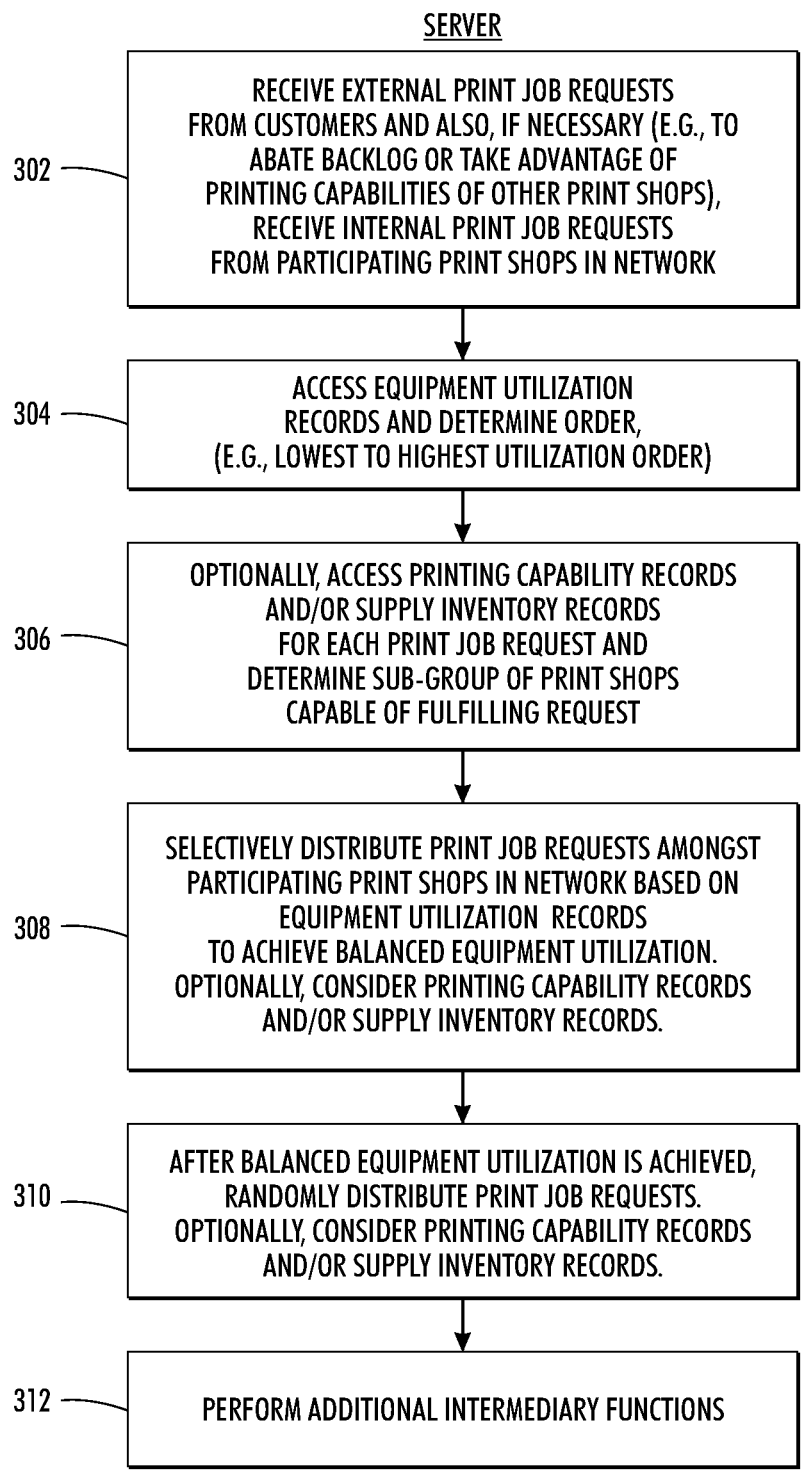
FIG. 3 is a flow diagram illustrating additional process steps of the method embodiment for implementing a print services network.

Referring to FIG. 3 in combination with FIG. 1, the method embodiments can further comprise receiving, by a server 150, of external print job requests (i.e., first print job requests) from customers 175*a-c* (302). As discussed in detail above, for purposes of this application, the term "external print job requests" refers to print job requests submitted to the server 150 by customers 175*a-c*. That is, the external print job requests are submitted to the server 150 rather than to a particular print shop. Submission of external print job requests to the server 150 by customers 175*a-c* can, for example, be achieved through the use of an on-line print job request form. Additionally or alternatively, submission of external print job requests to the server 150 by customers 175*a-c* can be achieved through one or more other known means of communication (e.g., electronic mail, text messaging, voice messaging, via an agent, etc.).

Then, the external print job requests can be distributed amongst the multiple participating print shops for fulfillment, by the server 150 (308). Specifically, the method embodiments can comprise accessing, by the server 150 from the data storage device 160, the equipment utilization records and determining the relative order of equipment utilization (e.g., lowest to highest) (304). Then, the external print job requests can be selectively distributed, by the server 150, amongst the multiple print shops 101*a-c* in order to balance printing equipment utilization across the network (308). For example, the external print job requests can be distributed to print shops with a relatively low percentage of equipment utilization (e.g., 101*a* and 101*b*) before being distributed to a print shop with a relatively high percentage of equipment utilization (e.g., 101*c*). Once balanced printing equipment utilization is achieved, any additional external print job requests can be randomly distributed amongst the multiple print shops 101a-c (310).

It should be noted that, when printing capabilities vary from print shop to print shop within the network, distribution of external print job requests can be based on both the equipment utilization records 161 and the printing capability records 162. Specifically, prior to distribution of a particular external print job request to one of the print shops 101a-c, the printing capability records 162 can be accessed, by the server 150, to determine a sub-group of possible print shops having the printing capabilities required to fulfill the particular external print job (306). Then, at process 308, the particular external print job can be selectively distributed to a print shop within that sub-group based on the equipment utilization records 161. In other words, in the case where printing capabilities vary from print shop to print shop, the external print job requests can be distributed amongst the multiple participating print shops 101a-c in the network based on both printing capability records 162 and the equipment utilization records 161. Similarly, supply inventory records 163 for each of the print shops can also be accessed at process 306 and considered during distribution at process 308 to ensure that print job requests are only distributed to those print shops having sufficient supplies to fulfill the requests.

Figure 4:
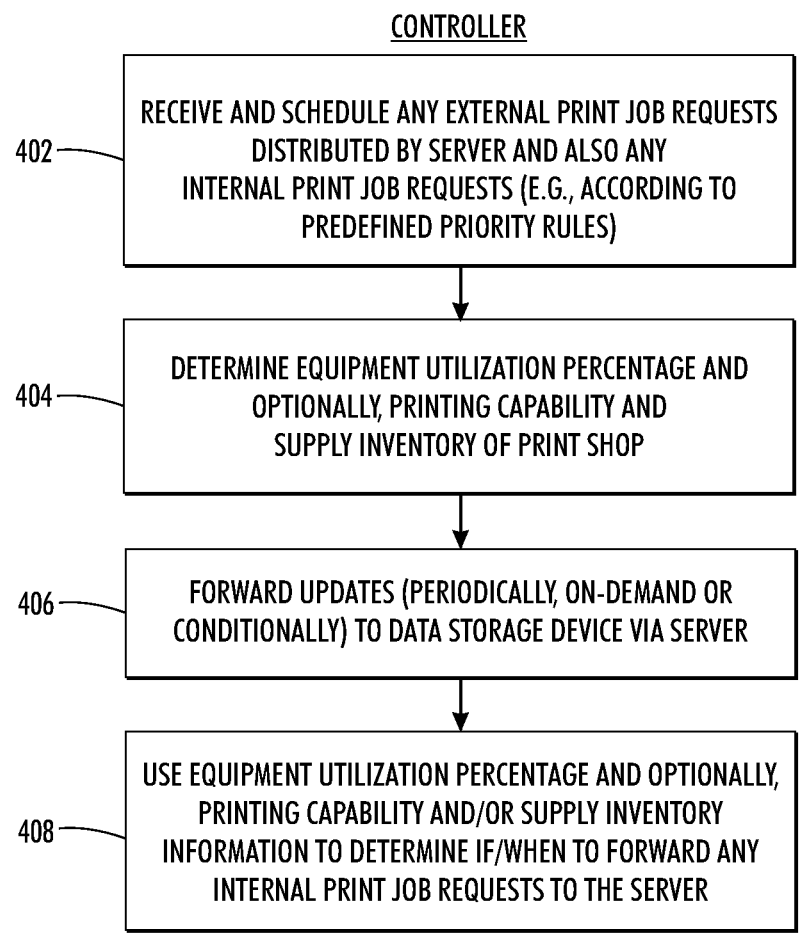
FIG. 4 is a flow diagram illustrating yet additional process steps of the method embodiment for implementing a print services network.

Referring to FIG. 4 in combination with FIG. 1, the method embodiments can further comprise receiving and scheduling, by a print shop controller 103a-c for a particular print shop 101a-c, fulfillment of any internal print job requests (i.e., second print job requests) and any external print job requests (i.e., first print job requests) distributed to the particular print shop by the server 150 (402). As mentioned above, the term "internal print job requests" refers to print job requests that are submitted to a particular print shop (e.g., print shop 101a, 101b, or 101c by user 104a-c, respectively (e.g., by an owner, employee, local customer, etc. of the enterprise operating that particular print shop 102) and not to the server 150. It should be noted that this scheduling process can be performed according to defined priority rules. For example, any external print jobs can be scheduled according to a lower priority than the any internal print job requests.

Additionally, the method embodiments can comprise determining, by each print shop controller 103a-c, the equipment utilization percentage (i.e., the operating capacity) and, optionally, the printing capability and/or supply inventory of its corresponding print shop (404). As discussed above, this information can be used to update the records in data storage device 160 and, more particularly, to update the equipment utilization records 161 and, optionally, the printing capabilities records 162 and/or the supply inventory records 163 in order to receive external print job requests, when the operating capacity is low (406). However, it can also be used to determine if internal print job requests should be forwarded to the server 150 (408). For example, if a determination is made that a particular print shop (e.g., 103b) is operating at maximum capacity with a backlog of internal print job requests, the backlog of internal print job requests can be forwarded by the controller 103b to the server 150. Similarly, if a determination is made that a particular internal print job request is outside the printing capabilities or exceeds the supply inventory of a particular print shop (e.g., 103c), the particular print job request can be forwarded by the controller 103c to the server 150. Then, such requests can be received and distributed, by the server 150, to any other print shop (e.g., 101a) in the network for fulfillment based on the equipment utilization records 161 and, if necessary, on the printing capability records 162 and/or the supply inventory records 163 (in the same manner as illustrated in FIG. 3 and discussed in detail above with regard to the external print job requests).

In addition to the method steps described above the method embodiments can further comprise performing, by the server 150, of intermediary functions such as billing operations, payment receipt operations, delivery and/or pickup notifications, etc. (see process 312 of FIG. 3). For example, a customer (e.g., 175a) can be provided with an option to pick-up a finished job at the print shop that fulfilled the job or, alternatively, to have the finished job delivered (e.g., by courier, package delivery service, U.S. Mail, etc.) to a specified location. Then, the customer 175a can be notified, by the server 150 (e.g., by electronic mail, text message, automated voice message, or any other suitable communication means), when the finished job is ready for pick-up or has been shipped. This ensures that customers 175a-c submitting external print job requests to the server 150 via customer interfaces 174a-c receive seamless and simplified access to the various print services offered through the network. It should be noted that billing and payment for fulfilling an external print job request can be set according to a pre-established pricing schedule stored in the data storage device 160 applicable across the network (see item 205 of FIG. 2). Optionally, the pre-established pricing schedule can provide for preferred pricing for network participants (e.g. in the case of internal print job requests forwarded to the server by a print shop controller for a participating print shop).

Also disclosed herein are embodiments of a computer program product. This computer program product can comprise a computer usable medium. The computer useable medium can have computer useable program code embodied therewith, which can be configured to perform the above-described method for implementing a federated print services network. This computer program product can comprise a tangible computer-usable (i.e., computer-readable) medium on which a computer-useable (i.e., computer-readable) program code (i.e., a control program, a set of executable instructions, etc.) is recorded or embodied. Tangible computer-usable media can, for example, a memory device on which the program is recorded or, alternatively, can comprise a transmittable carrier wave in which the program is embodied as a data signal. Exemplary forms of tangible computer-usable media include, but are not limited to, floppy disks, flexible disks, hard disks, magnetic tape, any other magnetic storage medium, CD-ROM, DVD, any other optical medium, a RAM, a PROM, an EPROM, a FLASH-EPROM, any other memory chip or cartridge, transmission media (e.g., acoustic or light waves generated during radio wave or infrared data communications, respectively) or any other medium from which a computer can read and use program code. In this case, the computer-usable program code can be specifically configured to perform the above-described method for implementing a federated print services network. That is, the computer-usable program code can be read by and executed by a computer in order to perform the above-described method.

Many computerized devices are discussed above (e.g., controllers 103a-c, server 150, computer terminals 174, etc.). Such computerized devices often include components, such as chip-based central processing units (CPU's), input/output devices (including graphic user interfaces (GUI)), memories, comparators, processors, power supplies, wiring, network connections, etc., and are readily available through a variety of different manufacturers, including but not limited to, Dell Computers, Round Rock Tex., USA and Apple Computer Co., Cupertino Calif., USA. Such computerized devices may also include peripheral devices, such as scanners, which are readily available through a variety of different manufacturers, including but not limited to, Xerox Corporation, Norwalk, Conn., USA. The details of such computerized devices, including the above-mentioned components and peripheral equipment, are well-known in the art and are omitted from this specification in order to allow the reader to focus on the salient aspects of the embodiments described herein. Additionally, while a number of the components of the system 100 of the present invention are described above and illustrated in FIG. 1 as being discrete components, any one or more of these components may be integrated in a single device. For example, the data storage device 160 may comprise a discrete data storage device remotely located from the server 150 or, alternatively, it may comprise an integrated component of the server 150. Similarly, the controller 103a-c of a given print shop 101a-c, respectively may comprise a discrete controller remotely located from the print shop printing equipment or, alternatively, it may comprise an integrated component of the print shop printing equipment.

As mentioned above, the term "printing equipment" as used herein includes, but is not limited to, one or more printers, cutters, staplers, collators, binders, etc. used to generate a finished product (i.e., printed material). Additionally, it should be noted that the term "printer" as used herein encompasses any apparatus, such as a digital copier, bookmaking machine, facsimile machine, multi-function machine, etc. which performs a print outputting function for any purpose. Printers or other printing equipment used in the participating print shops of the embodiments disclosed above can vary and can include any number of different printing and finishing options (e.g., paper options, color options, print quality options, page/sheet options, single or double-sided options, collating options, cutting options, stapling options, binding options, other finishing options, etc.) and can further include electrostatographic and/or xerographic machines and/or processes. The details of printers and other printing equipment are well-known by those ordinarily skilled in the art and are discussed in, for example, U.S. Pat. No. 6,032,004, the complete disclosure of which is fully incorporated herein by reference.

Finally, it will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein should not be implied or imported from any above example as limitations to any particular order, number, position, size, shape, angle, color, or material.

Therefore, disclosed above are embodiments of system, method and computer program product for implementing a print services network. The embodiments provide a central server that receives external print job requests from customers and, optionally, any backlog of internal print job requests from a participating print shop or any internal print job requests that are outside a participating print shop's current printing capabilities or that exceed the participating print shop's inventory of printing supplies. The server selectively distributes those requests for fulfillment amongst the participating print shops, which can include both print services enterprises and non-print services enterprises alike. Distribution is based on printing equipment utilization records in order to achieve balanced equipment utilization across the network. For example, the server can distribute such print job requests to print shops with a relatively low percentage of equipment utilization before print shops with a relatively high percentage of equipment utilization. Once essentially balanced equipment utilization is achieved, the server can randomly distribute any subsequently received print job requests. If necessary, distribution can also be based on printing capability records and/or supply inventory records. Thus, for participating print shops in the network, the embodiments provide a means for increasing equipment utilization percentages during downtimes and, thereby a means to subsidize the cost of ownership. This is especially advantageous in the case of non-print services enterprises (i.e., enterprises that do not directly offer and provide commercial print services to customers) and may provide such non-print services enterprises with the motivation to purchase printing equipment based on printing capacity and capability specifications that are at or above their current or expected requirements. The embodiments also provide a means for abating any backlog of internal print job requests and fulfilling any internal print job requests that are outside a particular print shop's printing capabilities or that exceed a particular print shop's supply inventory.

What is claimed is:

1. A method for implementing a federated print services network, said method comprising:
receiving, by a server, first print job requests from customers, at least one of said first print job requests being submitted by at least one of said customers to said server through a website that is associated with said network;
accessing, by said server from a data storage device, equipment utilization records for printing equipment in multiple print shops participating in said network, said multiple print shops being discrete document production environments operated by independent print services enterprises that offer and directly provide print services to said customers and at least one print department of a non-print services enterprise that does not offer and directly provide said print services to said customers; and,
distributing, by said server and based on said equipment utilization records, said first print job requests amongst said multiple print shops for fulfillment,
said equipment utilization records indicating printing equipment utilization percentages for said multiple print shops,
said printing equipment comprising printers,
each equipment utilization percentage for each print shop being an indication of a capacity at which said print shop is operating, and
said distributing comprising:
determining a relative order of said printing equipment utilization percentages for said multiple print shops from a lowest equipment utilization percentage to a highest equipment utilization percentage; and,
selectively distributing said first print job requests amongst said multiple print shops based on said relative order of said printing equipment utilization percentages until balanced equipment utilization across said multiple print shops is achieved.

2. The method of claim 1, said distributing further comprising, once said balanced equipment utilization is achieved, randomly distributing any remaining first print job requests amongst said multiple print shops.

3. The method of claim 1, further comprising scheduling, by a print shop controller for a particular print shop, fulfillment of any second print job requests specifically submitted by other customers directly to said particular print shop and any first print job requests distributed to said particular print shop by said server.

4. The method of claim 3, said scheduling further comprising scheduling said any first print job requests for fulfillment according to a lower priority than said any second print job requests.

5. The method of claim 1, further comprising accessing, by said server from said data storage device, printing capability records and supply inventory records for said multiple print shops, said selectively distributing of said first print job requests amongst said multiple print shops further being based on said printing capability records and said supply inventory records, said supply inventory records indicating inventories of consumable supplies, and said consumable supplies comprising at least paper and toner.

6. The method of claim 1, further comprising receiving, by said server from any print shop operating at maximum capacity, any backlog of print job requests for distribution to any other print shop in said network based on said equipment utilization records.

7. A method for implementing a federated print services network, said method comprising:
receiving, by a server, print job requests from customers, at least one of said print job requests being submitted by at least one of said customers to said server through a website that is associated with said network and that provides print services pricing information to said customers based on a pre-established pricing schedule applicable across said network;
accessing, by said server from a data storage device, equipment utilization records for printing equipment in multiple print shops participating in said network, said multiple print shops being discrete document production environments operated by independent print services enterprises that offer and directly provide print services to said customers and at least one print department of a non-print services enterprise that does not offer and directly provide said print services to said customers;
distributing, by said server and based on said equipment utilization records, said print job requests amongst said multiple print shops for fulfillment,
said equipment utilization records indicating printing equipment utilization percentages for said multiple print shops,
said printing equipment comprising printers,
each equipment utilization percentage for each print shop being an indication of a capacity at which said print shop is operating, and
said distributing comprising:
determining a relative order of said printing equipment utilization percentages for said multiple print shops from a lowest equipment utilization percentage to a highest equipment utilization percentage; and,
selectively distributing said print job requests amongst said multiple print shops based on said relative order of said printing equipment utilization percentages until balanced equipment utilization across said multiple print shops is achieved;
providing, by said server, a customer with options for both pick-up of a finished print job at a particular print shop upon fulfillment by said particular print shop of a particular print job request received by said server from said customer and delivery of said finished print job to a specified location, said delivery being performed by any one of a courier, a package delivery service and a mail delivery service; and
notifying, by said server, said customer with any one of pick-up information and delivery information for said finished print job.

8. A system for implementing a federated print services network comprising:
a data storage device storing equipment utilization records for printing equipment in multiple print shops participating in said network, said multiple print shops being discrete document production environments operated by independent print services enterprises that offer and directly provide print services to customers and at least one print department of a non-print services enterprise that does not offer and directly provide said print services to said customers; and,
a server receiving first print job requests from customers, at least one of said first print job requests being submitted by at least one of said customers to said server through a website that is associated with said network, said server further accessing said equipment utilization records and distributing said first print job requests amongst said multiple print shops for fulfillment based on said equipment utilization records,
said equipment utilization records indicating printing equipment utilization percentages for said multiple print shops,
said printing equipment comprising printers,
each equipment utilization percentage for each print shop being an indication of a capacity at which said print shop is operating, and
said server performing said distributing by determining a relative order of said printing equipment utilization percentages for said multiple print shops from a lowest equipment utilization percentage to a highest equipment utilization percentage and selectively distributing said first print job requests amongst said multiple print shops based on said relative order of said printing equipment utilization percentages until balanced equipment utilization across said multiple print shops is achieved.

9. The system of claim 8, said server further performing said distributing by randomly distributing any remaining first print job requests amongst said multiple print shops once said balanced equipment utilization is achieved.

10. The system of claim 8, further comprising multiple print shop controllers, each print shop controller being in communication with said server, being associated with a particular print shop in said network, receiving any first print job requests distributed to said particular print shop by said server, receiving any second print job requests submitted by other customers directly to said particular print shop, and scheduling fulfillment, by said particular print shop, of said any first print job requests and said any second print job requests.

11. The system of claim 10, said print shop controller further scheduling said any first print job requests according to a lower priority than said any second print job requests.

12. The system of claim 10, said data storage device further receiving, from said print shop controllers via said server, updates to said equipment utilization records.

13. The system of claim 8, said data storage device further storing printing capability records and supply inventory records for said multiple print shops and said server further performing said selectively distributing of said first print job requests amongst said multiple print shops based said printing capability records and said supply inventory records, said supply inventory records indicating inventories of consumable supplies, and said consumable supplies comprising at least paper and toner.

14. The system of claim 8, said server further receiving, from any print shop operating at maximum capacity, any backlog of print job requests for distribution to any other print shop in said network based on said equipment utilization records.

15. A computer program product comprising a memory device storing computer usable program code and said computer usable program code being executable by a computer to perform a method for implementing a federated print services network, said method comprising:

receiving print job requests from customers, at least one of said print job requests being submitted by at least one of said customers through a website that is associated with said network;

accessing equipment utilization records for printing equipment in multiple print shops participating in said network, said multiple print shops being discrete document production environments operated by independent print services enterprises that offer and directly provide print services to customers and at least one print department of a non-print services enterprise that does not offer and directly provide said print services to said customers; and, distributing said print job requests amongst multiple print shops for fulfillment based on said equipment utilization records, said equipment utilization records indicating printing equipment utilization percentages for said multiple print shops, said printing equipment comprising printers, each equipment utilization percentage for each print shop being an indication of a capacity at which said print shop is operating, and said distributing comprising:

determining a relative order of said printing equipment utilization percentages for said multiple print shops from a lowest equipment utilization percentage to a highest equipment utilization percentage; and, selectively distributing said print job requests amongst said multiple print shops based on said relative order of said printing equipment utilization percentages until balanced equipment utilization across said multiple print shops is achieved.

16. The computer program product of claim 15, said distributing further comprising, once said balanced equipment utilization is achieved, randomly distributing any remaining print job requests amongst said multiple print shops.

17. The computer program product of claim 15, said selectively distributing of said print job requests amongst said multiple print shops further being based on printing capability records and supply inventory records for said multiple print shops, said supply inventory records indicating inventories of consumable supplies, and said consumable supplies comprising at least paper and toner.

18. The computer program product of claim 15, said method further comprising receiving, from any print shop operating at maximum capacity, any backlog of print job requests for distribution to any other print shop in said network based on said equipment utilization records.

\* \* \* \* \*